United States Patent
Hayes

(10) Patent No.: US 6,759,963 B2
(45) Date of Patent: Jul. 6, 2004

(54) WHEEL BEARING TEMPERATURE INDICATOR

(75) Inventor: Brian D. Hayes, Newark, OH (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/851,522

(22) Filed: May 8, 2001

(65) Prior Publication Data

US 2002/0167401 A1 Nov. 14, 2002

(51) Int. Cl.$^7$ .............................................. G08B 17/00
(52) U.S. Cl. ...................................................... 340/584
(58) Field of Search .................................. 340/584, 438, 340/449, 679, 682, 440, 589; 73/862.49, 862.67, 118.1, 593, 660

(56) References Cited

U.S. PATENT DOCUMENTS

| | | | | |
|---|---|---|---|---|
| 3,772,549 A | * | 11/1973 | Cumming ................... 310/168 |
| 3,930,629 A | * | 1/1976 | Armstrong et al. ...... 246/169 A |
| 4,812,826 A | * | 3/1989 | Kaufman et al. ........... 340/682 |
| 5,061,917 A | * | 10/1991 | Higgs et al. ................. 340/539 |
| 5,381,090 A | * | 1/1995 | Adler et al. ................. 324/174 |
| 5,446,452 A | * | 8/1995 | Litton .................... 340/870.17 |
| 5,633,628 A | * | 5/1997 | Denny et al. ................ 340/854 |
| 5,642,944 A | * | 7/1997 | Dublin, Jr. et al. ......... 348/102 |
| 5,667,313 A | * | 9/1997 | Kapaan et al. .............. 384/544 |
| 5,959,365 A | * | 9/1999 | Mantini et al. ............ 307/10.1 |
| 6,203,114 B1 | | 3/2001 | Ehrlich |
| 6,236,328 B1 | * | 5/2001 | Smith et al. ................. 340/682 |
| 6,392,562 B1 | * | 5/2002 | Boston et al. .......... 340/870.28 |
| 6,546,892 B2 | * | 4/2003 | Kelly et al. .................. 116/216 |

OTHER PUBLICATIONS

"Special Investigation Report–13 Medium/Heavy Truck Wheel Separations", National Transportation Safety Board, PB92–917004, NTSB/SIR–S2/04.

"Heavy Truck Wheel Separations: An In–Depth Study of Real–World Incidents", Proceedings of the Canadian Multidisciplinary Road Safety Conference XI; May 9–12, 1999, Halifax, Nova Scotia.

Int'l Search Report, dated Jan. 15, 2004.

* cited by examiner

*Primary Examiner*—Daniel J. Wu
*Assistant Examiner*—Tai T. Nguyen
(74) *Attorney, Agent, or Firm*—Carlson, Gaskey & Olds, PC

(57) ABSTRACT

A temperature indicator is mounted within a wheel hub to generate a warning signal when a wheel end component overheats. The temperature indicator comprises a thermal battery that is activated only when the wheel end component exceed a predetermined temperature. Once activated the battery powers an RF transmitter to generate a wireless warning signal that is transmitted to a remote receiver to display a warning.

24 Claims, 2 Drawing Sheets

WHEEL BEARING TEMPERATURE INDICATOR

BACKGROUND OF THE INVENTION

This invention relates to a temperature indicator incorporated into a wheel hub to generate a warning signal when wheel end component temperatures exceed a predetermined limit.

Wheel separation occurs when a wheel end assembly component becomes separated from the associated axle. A wheel end assembly includes a wheel hub that is rotatably supported on a spindle with bearings. Many wheel separation incidents involve disintegration of the wheel bearings and/or spindles.

Typically, these separations occur as a result of improper maintenance, such as inadequate lubrication or incorrect bearing adjustment, for example. This causes the bearings and spindle to experience elevated temperatures. During extended vehicle operation, these temperatures can approach the melting point of the wheel end components, which will eventually cause wheel separation.

Vehicle operators have indicated that it is difficult to determine whether the wheel end components are operating at elevated temperatures. Often, wheel separation can occur with no warning to the operator.

Thus, it is desirable to have a way to provide the operators with an indication of when the wheel end components are experiencing temperatures that exceed the normal operating range. The indicating method and apparatus should be cost effective, easily incorporated into the wheel end, and should provide an accurate indication of when components are operating at elevated temperatures.

SUMMARY OF THE INVENTION

A temperature indicator is mounted within a wheel hub to generate a warning signal when wheel end components exceed a predetermined temperature. Preferably, the temperature indicator is comprised of a thermal battery that is activated only when the wheel end components exceed the predetermined temperature. Once activated, the battery powers an RF transmitter to generate a wireless warning signal that is transmitted to a remote receiver to display a warning.

In an alternate embodiment, the temperature indicator includes a first electrolyte and a second electrolyte separated by a metal alloy. The alloy has a predetermined melting point that generally corresponds to the predetermined temperature. When the temperature of the wheel end component exceeds the predetermined temperature the metal alloy melts to permit interaction between the first and second electrolytes to generate the warning signal.

The preferred inventive method for generating a warning to indicate overheated wheel end components includes the following steps. The temperature indicator is mounted adjacent to a bearing in a vehicle wheel assembly. The temperature indicator is activated only when wheel end component temperature exceeds a predetermined temperature and the warning signal is generated when the temperature indicator is activated.

The subject method and apparatus provides a simple and effective way to indicate when a wheel end component temperature has reached an undesirable limit. These and other features of the present invention can be best understood from the following specification and drawings, the following of which is a brief description.

DETAILED DESCRIPTION OF A PREFERRED EMBODIMENT

Figures 1A, 1B:
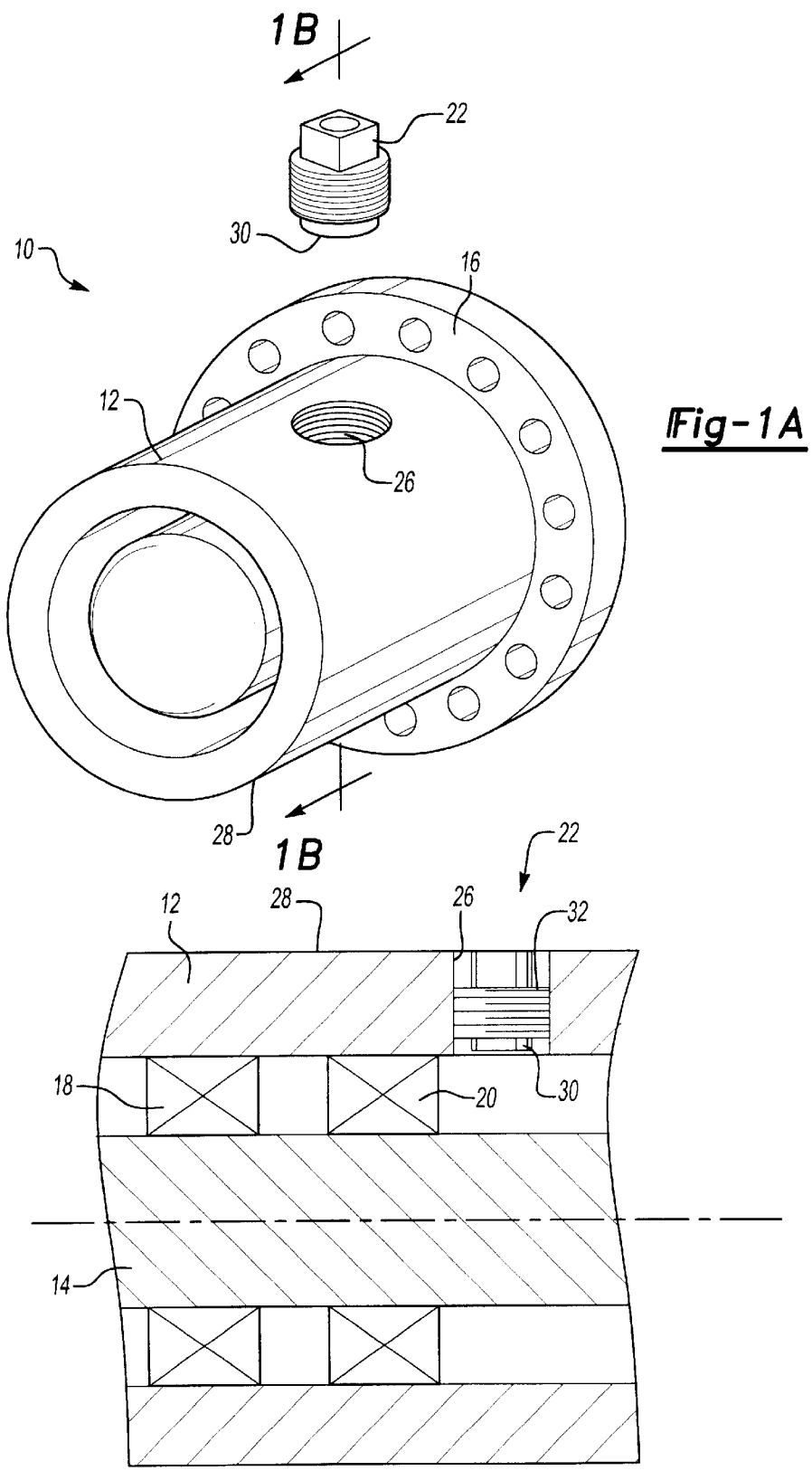
FIG. 1A is an exploded view of a wheel hub incorporating the subject invention.
FIG. 1B is a cross-section view of the hub shown in FIG. 1A.

A wheel end assembly 10 including a wheel hub 12 rotatably supported on a non-rotating spindle 14 is shown in FIGS. 1A and 1B. The hub 12 includes a flange 16 that is bolted to a wheel that includes tires (not shown). Preferably, the hub 12 is supported on the spindle 14 with a pair of bearings 18, 20. One bearing is an inner bearing 18 and the other bearing is an outer bearing 20 spaced apart from the inner bearing 18 by a predetermined distance. The inner bearing 18 is usually a larger capacity bearing than the outer bearing 20. Typically, these bearings are tapered roller bearings. However, other bearings known in the art could also be used.

A temperature indicator 22 is mounted within the hub 12 adjacent to one of the bearings 18, 20 to generate a warning signal 24 when a wheel component temperature exceeds a predetermined temperature. Preferably, the indicator 22 is mounted close to the outer bearing 20 because the outer bearing 20 has a tendency to overheat more quickly than the inner bearing 18 because the outer bearing 20 is typically smaller.

If the wheel end 10 has been improperly maintained, such as not having proper lubrication or having incorrect bearing adjustment, wheel end component temperatures can elevate to undesirable levels. Thus, the spindle 14, hub 12, or bearings 18, 20, for example, can experience temperatures close to their respective melting points resulting in component failure. The temperature indicator 22 generates the warning signal 24 once an elevated temperature is achieved.

The hub 12 includes a recess 26 formed within and accessible from an outer surface 28 of the hub 12. The temperature indicator 22 is mounted within the recess 26 for rotation with the hub 12. The temperature indicator 22 is preferably a thermal battery 30 that is only activated when the wheel end component temperature exceeds the predetermined temperature.

Figure 2:
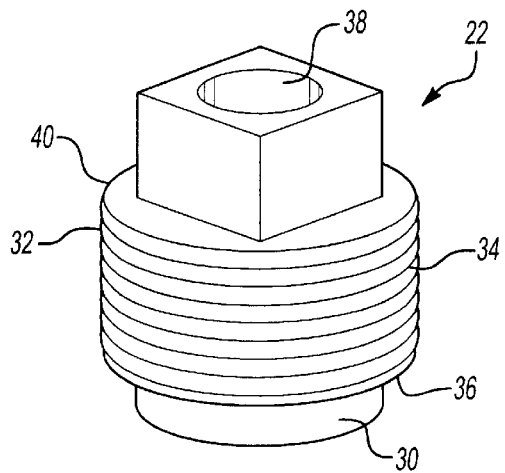
FIG. 2 is a magnified view of the temperature indicator of FIG. 1A.

In one embodiment, shown in FIG. 2, the thermal battery 30 includes an indicator housing 32 with a threaded portion 34 for threadably engaging the hub 12. The thermal battery 30 is preferably positioned at one end 36 of the housing 32 and an RF transmitter 38 is located at an opposite end 40 of the housing 32. The RF transmitter 38 is similar to that found commonly on passenger car remote keyless entry systems (RKE), which are well known. A receiver 42, shown in FIG. 3, located at a remote location from the hub 12 receives the coded warning signal 24, which issues a warning display 44 to a vehicle operator.

These thermal batteries 30 are commonly used for military ordnance fuzing, which requires an indefinite shelf life. This characteristic makes this system virtually zero-maintenance much like other passive automotive safety systems. Diehl and Eagle Picher are known for manufacturing these types of thermal batteries 30. Because RKE systems are very common, reliable, and include low cost components, incorporating them into the subject system provides a simple, low cost, long life warning indicator mechanism for detecting elevated wheel component temperatures.

Figure 3:
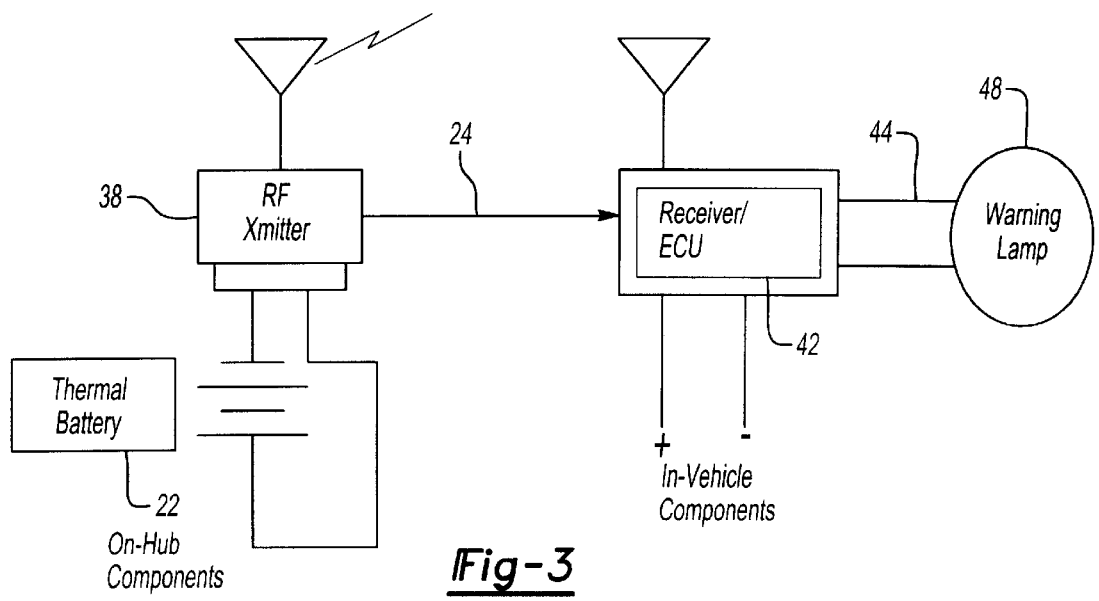
FIG. 3 is a schematic view of the operating system the wheel bearing temperature indicator.

The method for generating a warning to indicate overheated wheel components is exemplified in FIG. 3. The temperature indicator 22 is mounted within the wheel hub 12. The temperature indicator 22 is only activated when a wheel end component temperature exceeds a predetermined temperature. The warning signal 24 is automatically generated when the temperature indicator 22 is activated. The warning signal 24 is a wireless signal that is generated via the RF transmitter 38 that is also mounted within the hub 12. The warning signal 24 is transmitted to the receiver 42 that receives the warning signal 24 and displays a warning to the vehicle operator. The warning can be an audible or visual display, such as a warning light 48 mounted on a vehicle dash.

Figure 4:
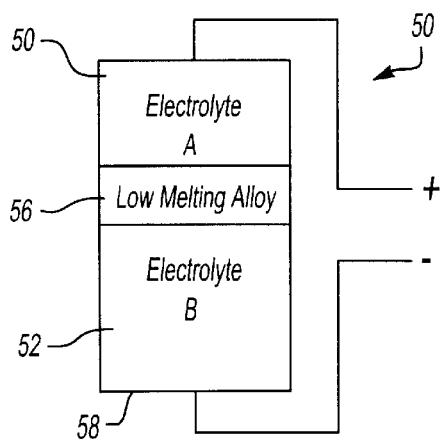
FIG. 4 is a schematic view of an alternate indicator.

An alternate temperature indicator 50 is shown in FIG. 4. This embodiment includes a first electrolyte 52 and a second electrolyte 54 that are separated by a low melting point alloy 56. Preferably, the low melting point alloy 56 has a melting point that is close to the desired predetermined temperature. When the low melting point 56 alloy melts away due to elevated wheel end operating temperatures, the first and second electrolytes 52, 54 interact as is known in the art to generate the warning signal 24. The first electrolyte 52, the second electrolyte 54, and the alloy 56 are preferably encased within a sealed housing 58 that is mounted to the hub 12. The transmitter 38 is electrically connected to the indicator 50 to receive power to generate the signal 24.

The subject method and apparatus provides a simple, long lasting, and cost effective way to accurately indicate when a wheel end component temperature has reached an undesirable limit.

Although a preferred embodiment of this invention has been disclosed, it should be understood that a worker of ordinary skill in the art would recognize many modifications come within the scope of this invention. For that reason, the following claims should be studied to determine the true scope and content of this invention.

What is claimed is:

1. A vehicle wheel assembly comprising:
   a non-rotating wheel component;
   a wheel hub mounted for rotation relative to said non-rotating wheel component via at least one bearing; and
   a temperature indicator mounted for rotation with said wheel hub adjacent to said bearing to generate a warning signal when the temperature of said bearing exceeds a predetermined limit.

2. The assembly according to claim 1 wherein said temperature indicator comprises a thermal battery that is activated to generate said warning signal only when the temperature of said bearing exceeds said predetermined limit.

3. The assembly according to claim 2 including an indicator housing having said battery mounted at one end and a RF transmitter mounted at an opposite end for generating a wireless warning signal.

4. The assembly according to claim 3 wherein said indicator housing includes a threaded body portion for engagement with said wheel hub.

5. The assembly according to claim 1 wherein said temperature indicator comprises a first electrolyte and a second electrolyte separated by a metal alloy having a predetermined melting point generally corresponding to said predetermined limit such that when the temperature of said bearing exceeds said predetermined limit said metal alloy melts to permit interaction between said first and second electrolytes to generate said warning signal.

6. The assembly according to claim 5 wherein said metal alloy, said first electrolyte, and said second electrolyte are sealed within a common casing and mounted directly to said wheel hub.

7. The assembly according to claim 1 including a receiver for receiving said warning signal and generating a display for a vehicle operator.

8. The assembly according to claim 7 wherein said warning signal is a wireless signal and said receiver located remotely from said wheel hub.

9. The assembly according to claim 1 wherein at least one bearing is comprised of an inner bearing and an outer bearing spaced apart from one another, said temperature indicator being encapsulated within said wheel hub adjacent to said outer bearing.

10. The assembly according to claim 1 including a recess formed within said wheel hub for receiving said temperature indicator.

11. The assembly according to claim 10 wherein said temperature indicator includes a housing portion mounted directly to said wheel hub within said recess such that said temperature indicator and said housing portion do not extend beyond an outer surface of said wheel hub.

12. A vehicle wheel end assembly comprising
   a spindle;
   a wheel hub supported for rotation relative to said spindle on inner and outer bearings;
   a temperature indicator mounted for rotation with said wheel hub adjacent to one of said bearings to generate a warning signal when a wheel component temperature exceeds a predetermined temperature; and
   a receiver unit for receiving said warning signal and generating warning display.

13. An assembly according to claim 12 wherein said warning signal is a wireless signal and said receiver is located at a position remote from said wheel hub.

14. An assembly according to claim 13 wherein said temperature indicator is a thermal battery including a RF transmitter wherein said battery is only activated to generate said warning signal via said transmitter when said wheel component temperature exceeds said predetermined temperature.

15. An assembly according to claim 12 wherein said temperature indicator includes a first electrolyte, a second electrolyte, and a metal alloy separating said first and second electrolytes and having a melting temperature corresponding to said predetermined temperature.

16. An assembly according to claim 12 wherein said temperature indicator is encapsulated within said hub adjacent to said outer bearing.

17. The assembly according to claim 12 including a recess formed within said wheel hub wherein said temperature indicator is mounted directly to wheel hub within said recess.

18. The assembly according to claim 17 wherein said temperature indicator is enclosed within a housing that mounted within said recess such that said housing does not extend beyond an outer or inner surface of said wheel hub.

19. A method for generating a warning to indicate overheated wheel end components comprising the of:
  (a) mounting a temperature indicator for rotation with a wheel hub adjacent to a bearing mounted in a vehicle wheel assembly;
  (b) activating the temperature indicator only when wheel end component temperature exceeds a predetermined temperature; and
  (c) generating a warning signal when the temperature indicator is activated.

20. A method according to claim 19 wherein the temperature indicator comprises a thermal battery with a transmitter and step (c) includes transmitting a wireless warning signal only after the thermal battery is activated during step (b).

21. A method according to claim 19 including receiving the warning signal and displaying a warning subsequent to step (c).

22. A method according to claim 19 wherein step (a) further includes mounting the temperature indicator directly to a rotating wheel hub.

23. A method according to claim 22 including the steps of enclosing the temperature indicator within a housing and encapsulating the housing within the wheel hub such that the housing does not extend beyond an outer surface of the wheel hub.

24. A method according to claim 19 further including the step of enclosing a first electrolyte, a second electrolyte, and a metal alloy separating the first and second electrolytes and having a melting temperature corresponding to the predetermined temperature within a housing to form the temperature indicator.

* * * * *

UNITED STATES PATENT AND TRADEMARK OFFICE
CERTIFICATE OF CORRECTION

PATENT NO. : 6,759,963 B2
DATED : July 6, 2004
INVENTOR(S) : Hayes

It is certified that error appears in the above-identified patent and that said Letters Patent is hereby corrected as shown below:

Column 5,
Line 2, please insert -- steps -- after "the" and before "of"

Signed and Sealed this

Seventeenth Day of August, 2004

JON W. DUDAS
*Acting Director of the United States Patent and Trademark Office*